(12) United States Patent
Guim Bernat et al.

(10) Patent No.: US 11,379,264 B2
(45) Date of Patent: Jul. 5, 2022

(54) ADVANCED CLOUD ARCHITECTURES FOR POWER OUTAGE MITIGATION AND FLEXIBLE RESOURCE USE

(71) Applicant: Intel Corporation, Santa Clara, CA (US)

(72) Inventors: Francesc Guim Bernat, Barcelona (ES); Felipe Pastor Beneyto, Holmdel, NJ (US); Kshitij A. Doshi, Tempe, AZ (US); Timothy Verrall, Pleasant Hill, CA (US); Suraj Prabhakaran, Aachen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/384,554

(22) Filed: Apr. 15, 2019

(65) Prior Publication Data
US 2019/0243685 A1    Aug. 8, 2019

(51) Int. Cl.
*G06F 9/48*     (2006.01)
*G06F 1/3296*   (2019.01)
(Continued)

(52) U.S. Cl.
CPC ............ *G06F 9/4893* (2013.01); *G06F 1/206* (2013.01); *G06F 1/30* (2013.01); *G06F 1/3206* (2013.01);
(Continued)

(58) Field of Classification Search
None
See application file for complete search history.

(56) References Cited

U.S. PATENT DOCUMENTS 8,209,413 B1 * 6/2012 Turrichi, Jr ........... G06F 9/5094
                                                  709/224
9,336,030 B1 * 5/2016 Marr ..................... G06F 9/5077
(Continued)

FOREIGN PATENT DOCUMENTS

CN           104767273 A  *  7/2015  ............... E03D 9/08
WO      WO-2014013655 A1 *  1/2014  ............... G06F 1/28

OTHER PUBLICATIONS

Qpedia, "Nebs Compliance Testing: Thermal Management", Jan. 2010, 4 pages.
(Continued)

*Primary Examiner* — Abu Zar Ghaffari
(74) *Attorney, Agent, or Firm* — Compass IP Law PC

(57) ABSTRACT

Some examples provide for uninterruptible power supply form (UPS) resources and non-UPS resources to be offered in a composite node for customers to use. For a workload run on the composite node, monitoring of non-UPS resource power availability, resource temperature, and/or cooling facilities can take place. In the event, a non-UPS resource experiences a power outage or reduction in available power, temperature that is at or above a threshold level, and/or cooling facility outage, monitoring of performance of a workload executing on the non-UPS resource can take place. If the performance is acceptable and the power available to the non-UPS resource exceeds a threshold level, the supplied power can be reduced. If the performance experiences excessive levels of errors or slows unacceptably, the workload can be migrated to another non-UPS or UPS compliant resource.

25 Claims, 9 Drawing Sheets

(51) Int. Cl.
  *G06F 1/20* (2006.01)
  *G06F 9/50* (2006.01)
  *G06F 1/3206* (2019.01)
  *G06F 1/30* (2006.01)
  *G06F 1/3234* (2019.01)
(52) U.S. Cl.
  CPC .......... *G06F 1/3234* (2013.01); *G06F 1/3296* (2013.01); *G06F 9/4856* (2013.01); *G06F 9/5027* (2013.01); *G06F 9/5094* (2013.01); *G06F 2209/501* (2013.01); *Y02D 10/00* (2018.01)

(56) References Cited

U.S. PATENT DOCUMENTS

| | | | | |
|---|---|---|---|---|
| 2005/0111151 A1* | 5/2005 | Lam | ........................ | H04M 3/18 361/86 |
| 2009/0144568 A1* | 6/2009 | Fung | ..................... | G06F 1/3221 713/300 |
| 2012/0272243 A1* | 10/2012 | Nolterieke | ............ | G06F 9/5094 718/1 |
| 2014/0181544 A1* | 6/2014 | Breen | ..................... | H02J 1/102 713/320 |
| 2014/0258755 A1* | 9/2014 | Stenfort | .................... | G06F 1/30 713/323 |
| 2014/0330981 A1* | 11/2014 | Sirota | ..................... | G06F 9/485 709/226 |
| 2014/0365795 A1* | 12/2014 | Nielsen | ................... | G06F 1/329 713/320 |
| 2016/0027101 A1* | 1/2016 | Collins | ................... | G06F 9/505 705/26.3 |
| 2018/0004265 A1* | 1/2018 | James | ..................... | G06F 1/329 |
| 2018/0027067 A1 | 1/2018 | Bernat et al. | | |
| 2018/0027093 A1 | 1/2018 | Bernat et al. | | |
| 2018/0102953 A1* | 4/2018 | Mahindru | ........... | H04L 43/0817 |
| 2018/0157563 A1* | 6/2018 | Bryant | ................ | G06F 11/3062 |
| 2019/0004579 A1* | 1/2019 | Allen-Ware | .......... | G06F 1/3228 |
| 2019/0149684 A1* | 5/2019 | Ishikawa | ............ | H04N 1/00925 358/1.14 |
| 2020/0041972 A1* | 2/2020 | Hong | ................... | G05B 19/042 |

OTHER PUBLICATIONS

Sharma et al., "Reliability and energy efficiency in cloud computing systems: Survey and taxonomy," Journal of Network and Computer Applications (Oct. 2016).

* cited by examiner

ADVANCED CLOUD ARCHITECTURES FOR POWER OUTAGE MITIGATION AND FLEXIBLE RESOURCE USE

TECHNICAL FIELD

Various examples described herein relate to techniques for configuring computing resources for workload execution.

BACKGROUND

Cloud computing provides a client device with tremendous computing and storage resources of remote computers. The client can make use of a remote computer or cluster of computers to perform a variety of processing or computing operations as well as remote data processing and data storage or retrieval. For example, a client can be a smart phone, Internet-of-Things (IoT) compatible device such as a smart home, building appliance (e.g., refrigerator, light, camera, or lock), wearable device (e.g., health monitor, smart watch, smart glasses), connected vehicle (e.g., self-driving car), and smart city (e.g., traffic sensor, parking sensor, energy use sensor). Remote computers or clusters of computers can include a data center that is connected to the client using a high-speed networking connection. However, transferring data from the client to a remote computer can incur an unacceptable latency for time-sensitive applications that have strict requirements for promptly receiving results from the remote computer. For example, low latency requirements may arise from rapid but highly informed decisions needed by autonomous driving vehicles, smart homes, image recognition technologies, voice interface technologies, video surveillance for threat detection, cybersecurity, cloud services for mobile devices, industrial machines, or health monitoring system uses.

Edge computing is an emerging paradigm where computers, such as a data center of computing resources, are located physically closer to network access points that are in communication with the client devices. For example, an edge computing data center can be physically close or within the same physical room or building as a communication base stations or network connections in communication with client devices. The communication base stations or network connections can route requests for data processing or data transmission to the edge computing system.

DETAILED DESCRIPTION

Figure 1:
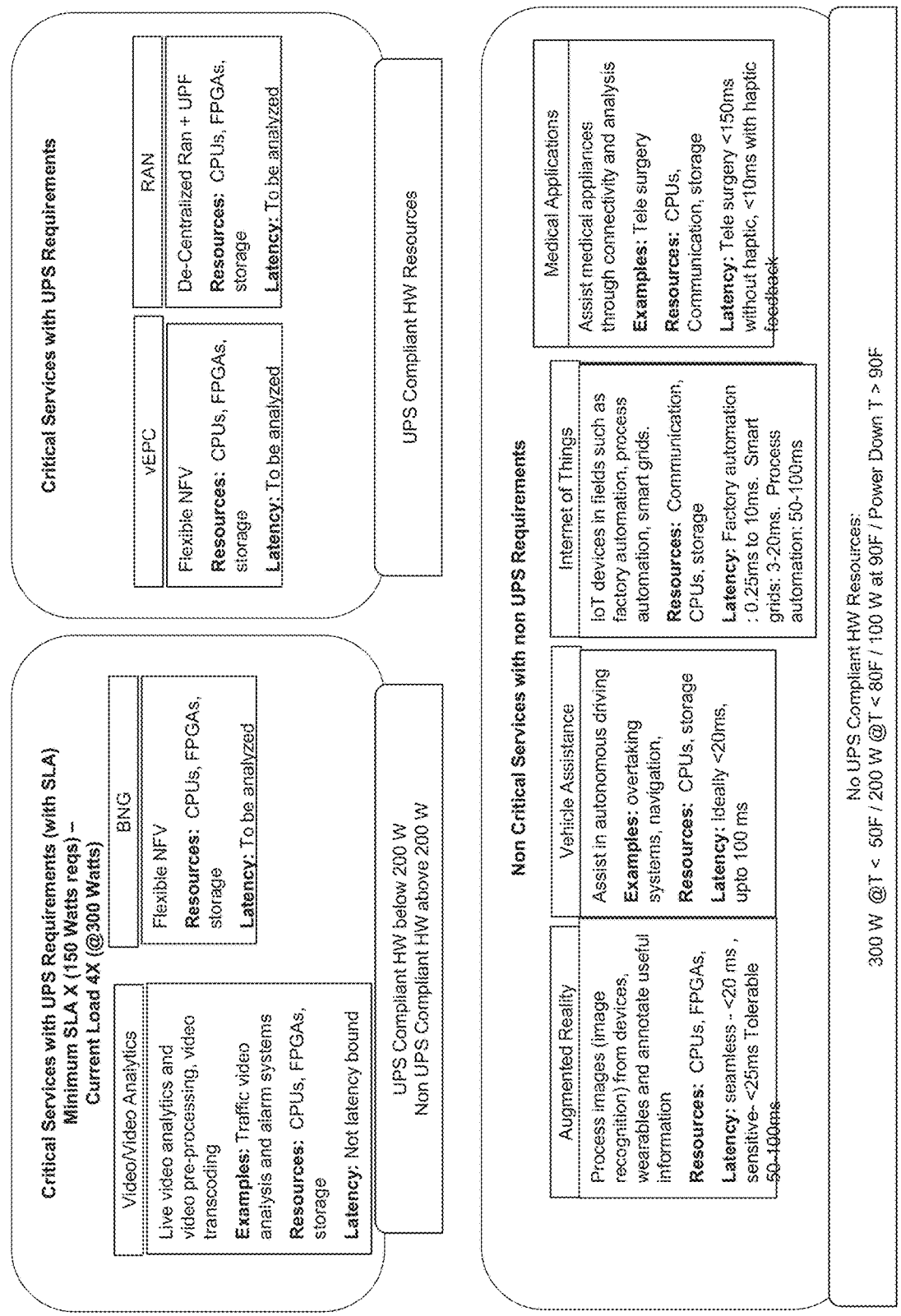
FIG. 1 depicts an example critical and non-critical Services mapping to UPS and non-UPS resources.

Edge computing offers various features. One feature is an ability to serve and respond to multiple applications (e.g., object tracking, video surveillance, connected cars, and so forth) in near-real time with low latency. Another feature is an ability to execute virtualized network functions (VNF) that were typically embodied in an application specific integrated circuit (ASIC) (e.g., network cloudification). Ability to execute VNF is relevant for operators (e.g., AT&T or Verizon) for several reasons: (1) flexibility on how to schedule and map execution of those VNF (e.g., different nodes depending on where the local breakouts are mapped) and (2) the capacity to scale up or down the amount of virtual network functions (VNFs) processing input streams depending on the amount of subscribers connected to the edge.

However, power supply and power consumption to edge computing nodes can pose a challenge. Edge computing nodes can be power constrained and therefore the power usage needs to be accounted for by the applications that are consuming the most power. There is also an inherent power-performance tradeoffs in these pooled memory resources, as many of them are likely to use emerging computing technologies, where more power is used for more throughput.

Some communications services must be provided in an uninterruptible power supply (UPS) form (e.g., defined in one or more of: Bellcore SR-3580, GR-63-CORE, GR-1089-CORE, GR-3109, and GR-3208)). In some embodiments, UPS compliance or compatibility can refer to compliance with power supply requirements or uninterruptable power supply requirements specified in one or more of: Bellcore SR-3580, GR-63-CORE, GR-1089-CORE, GR-3109, GR-3208, or similar standards. UPS was defined in order to specify that resources located in a telecommunication facility should operate in rough thermal conditions when a power outage happens and cooling facilities stop working. Some communications services are not critical (because either they are replicated in other central office or they can be provided by deeper edge tiers) and can be powered down in case of a power or cooling outage. Some communications services may have gradients of criticality (e.g., Service A is more critical than Service B).

Existing solutions deployed at the core of the operators' networks assume that all the services require UPS and that all the compute elements located in the central office are UPS compliant. Existing power management techniques consider power management offlining schemes for sockets, cores or devices have been defined mostly at platform level or use generic power down approaches independently of how the type of the resources running on the Central Office behave on cooling outage and the type of services running at each of those resources. For example, some resources may be performant under various temperatures whereas other resources are not performant under temperature variations.

Various embodiments permit creation of an edge node with both UPS and non-UPS compliant resources, whether the resources are distributed or located in the same server, rack, platform, or socket. The resources which are UPS complaint can execute services and network functions under critical environmental conditions. The resources which are not UPS compliant can work properly under certain temperature conditions (e.g., >50 degrees Celsius).

Various embodiments provide a configurable and smart power delivery when power or cooling outages occur (e.g., at rack level, at platform level, resource level, level of tenant, service, or VNF) depending on the type of services scheduled at a particular point of time to a resource. For example, in the event of a power or cooling outage, power delivery is maintained to the resources associated to critical UPS services whereas power delivery is throttled to non-critical resources and eventually, non-critical resources are powered off Various embodiments provide a set of extensions and protocols in order to provide smart power management per tenant or customer (user 1 from Company A or user 2 from the operator) when power or cooling outages occur and some of the services have UPS requirements and some other services have different levels of criticality while not having UPS requirements.

According to some embodiments, a power management system can decide: (1) what resources need to be powered; (2) how they need to be powered (e.g., reduce power supply to keep minimum service under an applicable service level agreement (SLA)); (3) when resources are to have input power reduced (e.g., a non-UPS resource running a non-critical service X has to run at 250 watts at a temperature 80° F. or 150 watts at a temperature of 100° F.) or shutdown (e.g., based on an excessive identified error rate).

Various embodiments include a rack power manager (e.g., that can be placed in the operators base station, in the central office or in the data center) that exposes interfaces to tenants and data center owners to configure: (a) what services deployed in the edge appliance must run in a UPS certified resource; (b) what services can run in non-UPS compliant resources, level of criticality and potentially SLAs; and/or (c) the POD manager to identify what resources are UPS or non-UPS compliant, and for the non-UPS compliant resources, at what thermal thresholds they must be shutdown.

Various embodiments include a power management or resource bandwidth throttling system to control how much thermal heat is actually generated when a power or cooling outage happens in a non-UPS compliant resource. In a case of a power outage, power is supplied to critical UPS resources and provided to the non-UPS compliant resources based on their criticality level. Similarly, in a cooling outage, non-UPS compliant resources can receive reduced power or resource throttling may be applied in order to reduce dissipated power and generated heat. Power usage for a non-UPS resource can be measured and power usage-based billing can be made to users for payment.

FIG. 1 depicts an example of critical and non-critical services mapping to UPS compliant and non-UPS compliant resources. For example, virtualized evolved packet core (vEPC) and radio access network (RAN) services can use UPS-compliant resources. Other services such as augmented reality, vehicle assistance, internet of things (IoT), or medical applications can use non-UPS compliant resources. These examples are non-limiting and the configuration can change. Some services such as video analytics and Broadband Network Gateway (BNG) can use UPS-compliant resources below a source power level and non-UPS compliant resources above a particular source power level.

Figure 2:
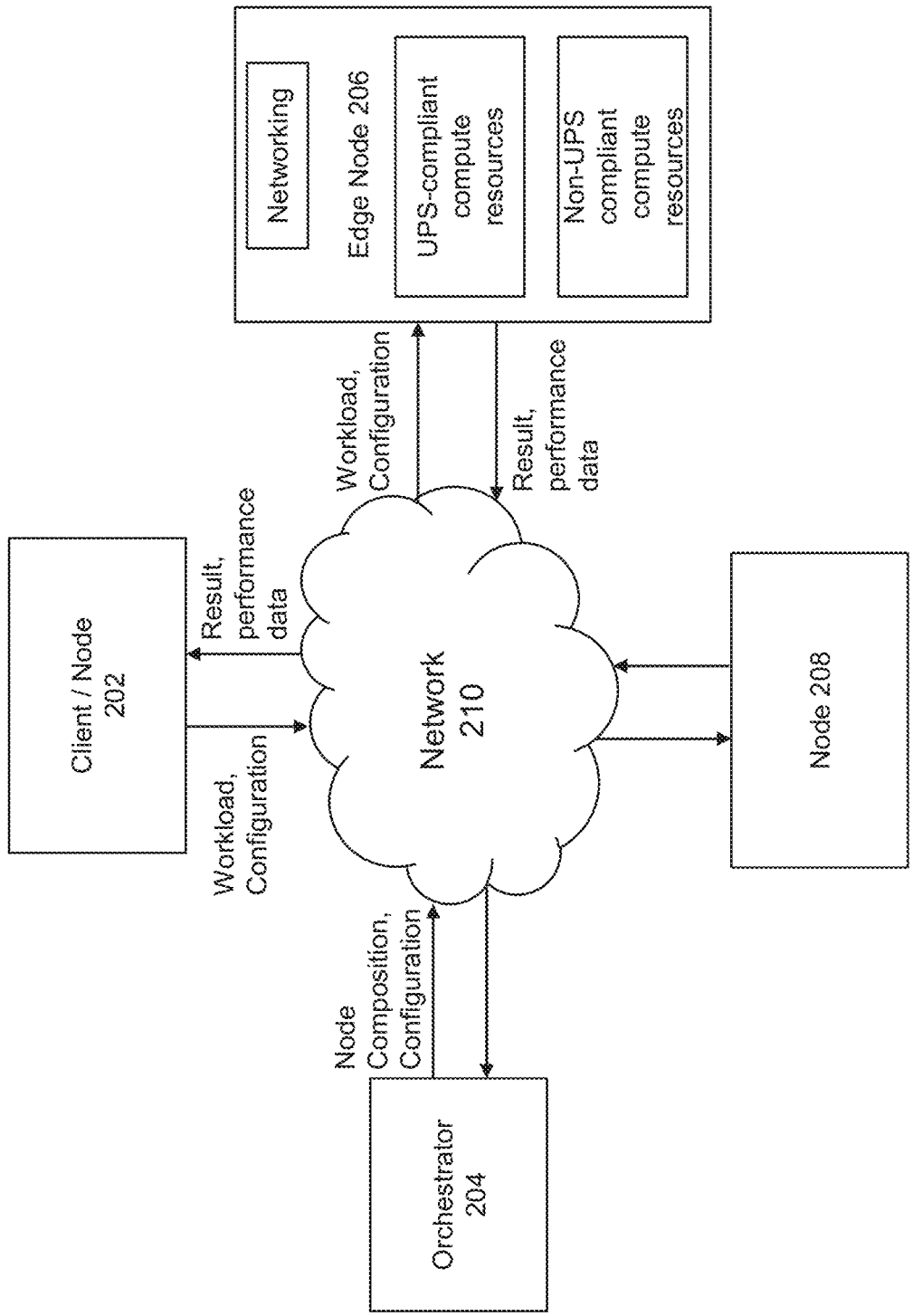
FIG. 2 depicts an example system.

FIG. 2 depicts an example system. In this example, a client/node 202 can request performance of a workload based on configuration settings related to power loss or cooling loss. For example, configuration settings can define actions to perform in the event of a power outage or cooling loss to a non-UPS compliant resource. For example, a particular configuration could prescribe that error rate or frame count be sent to an orchestrator or system software in the event of a power loss and a temperature of a the non-UPS resource exceeds X temperature. Client/node 202 can be any mobile computing device (e.g., phone, smart glasses, tablet, vehicle, and so forth), or a data center, edge node, fog node, server, computing cluster, internet or things (IoT) device, and so forth. An application or virtual machine executing on client/node 202 can issue a workload and configuration information (e.g., temperature threshold, workload performance, and actions to take in the event of a power outage or cooling outage).

Network 210 can be used for communications among devices. Network 210 can be implemented using the Internet, a private network, switch fabric, or interconnect, or other communications medium. Orchestrator 204 can form a composite node of compute resources to perform the workload. Orchestrator 204 (e.g., Open Network Automation Platform (ONAP) and Open Source Management and Orchestration (OSM)) can assemble and provide a composite node of hardware and software resources and orchestrator 204 can instantiate the environment for the particular tenant on the composite node. A composite node can be formed from compute, networking, memory, storage, and software resources in a device or separate devices that are communicatively coupled using network 210.

For example, edge node 206 can be selected to provide UPS-compliant and/or non-UPS-compliant compute resources to perform the worklaod. In other examples, resources across node 206 and node 208 (or other nodes) can be provided to perform the workload. Node 208 can be any computer, server, data center, rack, edge node, and so forth. In this example, edge node 206 is configured to perform the workload and it receives workload and configuration information. Edge node 206 provides results or performance data from the workload execution to client/node 202 and/or orchestrator 204.

Figure 3:
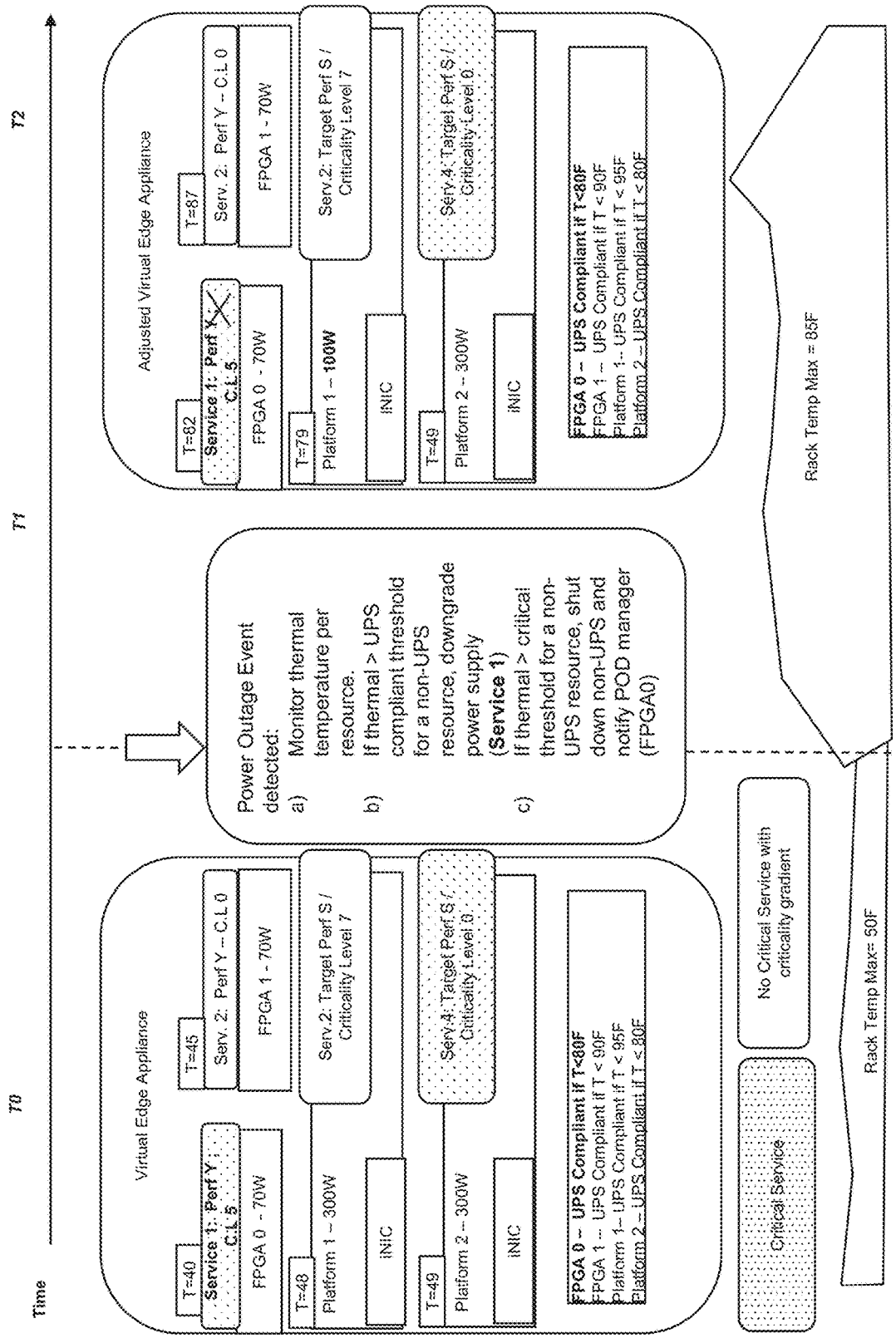
FIG. 3 shows an example management of a system after power loss. In this example, a power outage event is detected between times T0 and T1 such that an edge node loses its power supply.

FIG. 3 shows an example management of a system after power loss. In this example, a power outage event is detected between times T0 and T1 in which an edge node loses its power supply. In this example, devices FPGA0, FPGA1, Platform1, and Platform2 offer compute resources. In this example, thermal temperature is monitored at or near each resource at the edge node, although temperature can be measured in other places. Devices FPGA0 and Platform1 have compliant threshold temperature settings of 80° F. and 95° F. In this example, after the power outage event, a temperature of FPGA0 is detected to be 82° F. and a temperature of Platform1 is detected to be 79° F. The temperature of FPGA0 is detected to be 82° F., which exceeds the critical threshold temperature setting of 80° F. and the power supplied to FPGA0 for Service1 is reduced. In addition or alternatively, the temperature of FPGA0 exceeds the critical threshold temperature for non-UPS resources of 80° F. and the FPGA0 is shutdown.

An edge network can run many types of services (apart from the essential communication workloads (e.g., VNFs)). Some of those services are not as critical as communication workloads. For example, some types of non-critical workloads that can be performed at the edge network include virtual reality (VR)/augmented reality (AR), IoT and content distribution networks (CDNS). A criticality gradient can be defined whereby services that are not critical can have different levels of criticality. The level of critically can be open and depend on the original equipment manufacturer (OEM) or telecommunication equipment manufacturer (TEM) implementations or set in other manners at the discretion of the owner or operator.

For example, services could be graded in four different categories: critical levels 3-0. Critical Level 3 are hierarchical services such that if a service fails or is shut down in the base station (e.g., edge network), the service on the next level (e.g., central office) can still provide the service. An example of a Critical Level 3 service is a CDNS. Critical Level 2 are real time services that provide content in near-real time. For example, an AR/VR workload can be a Critical Level 2 service. If an AR/VR workload fails in the base station (e.g., edge network), the customer will experience a disconnect of that particular service until the base station is recovered or the customer moves to another base station. Critical Level 1 are real time services that are less permitted to fail at the base station than Critical Level 2 services. For example, a monetary transaction can be a Critical Level 1 service. A monetary transaction allows use cases related to monetary transactions and if a service that exposes biometry function as a service that is used by entities and banks to authorize monetary transactions (e.g., authenticate pay transactions). If this service fails, the operator or final customer may experience severe profit loss. Critical Level 0 are services that are to be UPS compliant and must be performed according to relevant SLAs. For example, a VNFS can defined as a Critical Level 0 service.

Figure 4:
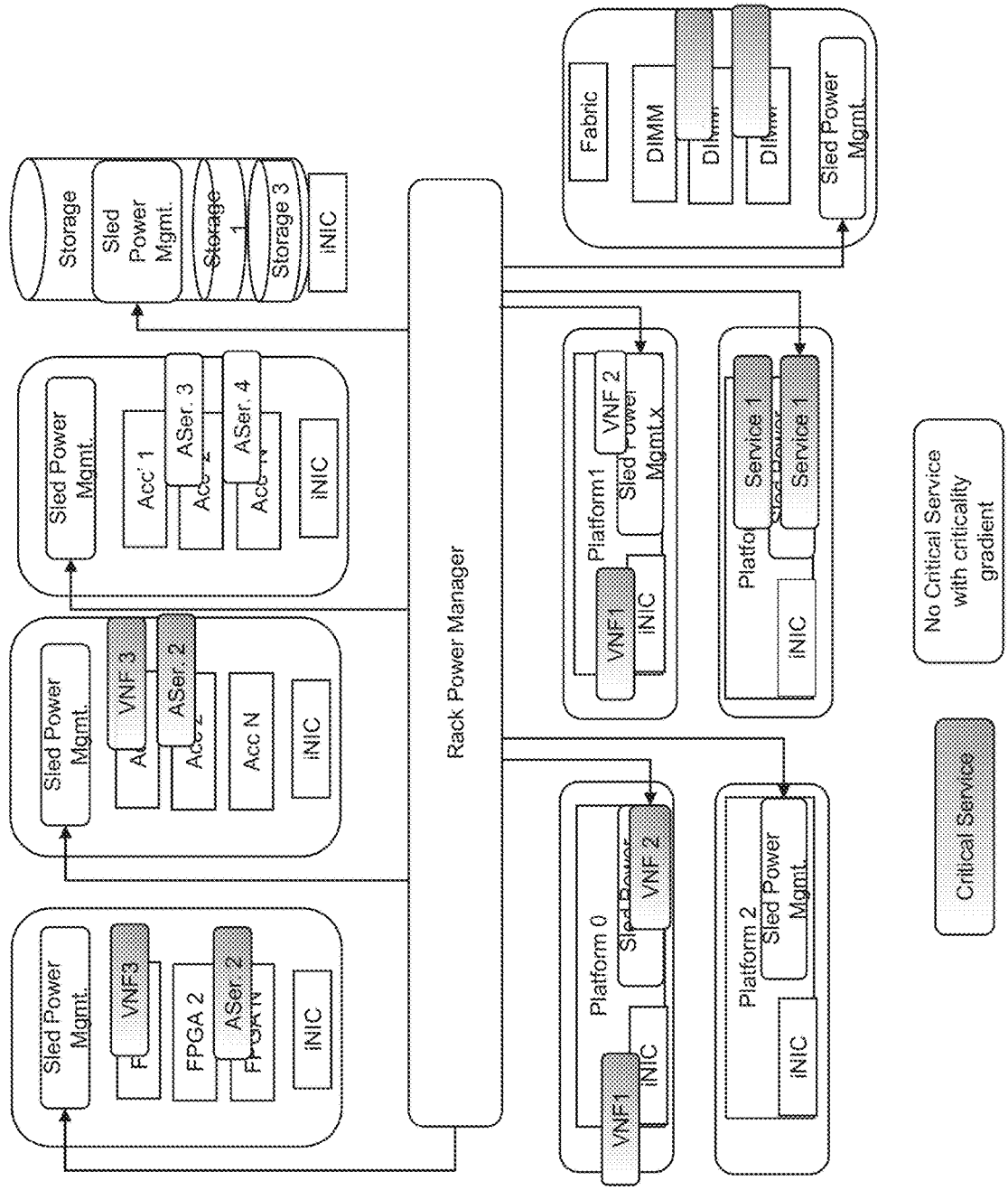
FIG. 4 depicts an example system that provides services with varying levels of criticality.

FIG. 4 depicts an example system that provides services with varying levels of criticality. In this example, there are critical services (Critical Level 0) and other services that have a Critical Level of 1 or more. For example, VNF1, some instances of VNF2, VNF3, Service 1, Storage 3, and instances of Aservice2 are defined as Critical Level 0. An instance of VNF2, Aservice3, and Aservice4 are defined as Critical Level 1 or higher.

The system can provide heterogeneous types of resources in the edge cloud appliance (base station or central office) based on their compliance with UPS or non-compliance with UPS. The assumption with UPS is that all the services running in this infrastructure will be running critical services. Thereby, a service should never fail or malfunction in case of power outage (if batteries are properly configured) or there is a cooling outage. A higher temperature can cause a higher error rate or even malfunction of non-UPS compliant resources or platforms. Various embodiments can provide for actions to take in the event of a power outage or cooling loss to non-UPS compliant resources or platforms.

Figure 5:
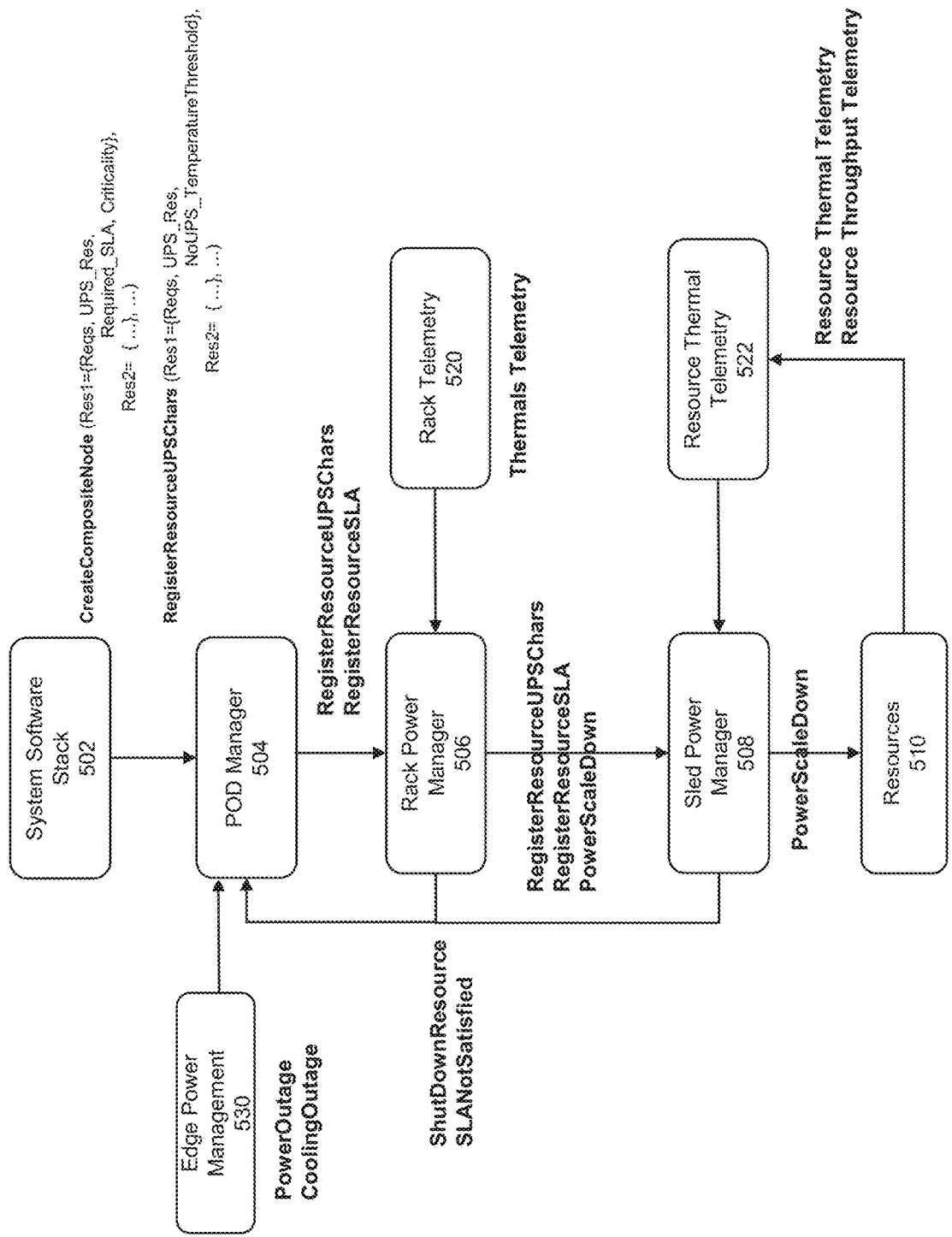
FIG. 5 depicts an example system for configuring resources.

FIG. 5 depicts an example system for configuring resources. System software stack 502 together with POD manager 504 can create a composite node by selecting the type of resources that are needed to deploy a set of services using UPS compliant or non-UPS compliant resources with critically requirements. POD manager 504 can expose interfaces to software stack 502 in order to allow: (1) software stack 502 to create nodes with certain UPS and non-UPS requirements with different levels of criticality; (2) software stack 502 to register new types of resources or the resources that are composed in the data center; and/or (3) software stack 502 to receive callbacks from power managers when performance thresholds are not fulfilled. For example, system software stack can be implemented using OpenStack, Kubernetes, or other container or virtual machine deployment systems.

Various embodiments permit system software stack 502 to select use of UPS resources and non-UPS resources for workloads and configuration of one or more of: control thermal dissipation, how power is delivered to non-UPS resources (to control their temperature or thermals), when the resources are to be shut down (when thermals thresholds are beyond their reliability/resiliency thermal resistance), or a maximum amount of power budget devoted to non-UPS services (or based on level of criticality) in case of a cooling or power outage. An orchestrator (not depicted) or the system software stack can specify one or more of the configuration parameters.

Pod manager 504 can assemble a composite node with resources (e.g., CPUs, memory, accelerators, and so forth) that are UPS or non-UPS compliant. POD manager 504 can allocate computer resources in an edge server cluster and/or can allocate resources on a data center to perform one or more workloads serially or in parallel. POD manager 504 maintains inventory of hardware elements that are UPS compliant and hardware elements that are not UPS compliant. When POD manager 504 creates a composite node to execute a given service or network function, the orchestrator can start a composite node and can specify the level of criticality of such service: (a) critical and can never stop; (b) critical but can tolerate being down during N units of time or certain amount of resource failure (performance degradation is tolerable), or (c) not-critical. For level (a) services, only UPS compliant resources are allocated to the composite node. For level (b) services, UPS and non-UPS resources can be allocated. For level (c) services, non-UPS compliant resources are allocated.

For criticality level (b), system software 502 or the orchestrator can specify the level of failures tolerated when power outage or cooling outage happens: N amount of failures/second for particular list of resource(s) (e.g., amount of memory or processing errors per second). Example of service level (b) could be surveillance that cannot be stopped more than 5 mins or can tolerate memory and compute errors (of 100 errors/s) as that can translate into inaccurate image processing.

For example, to create a composite node to perform one or more workloads, system software stack 502 can issue command CreateCompositeNode (Res1={Reqs, UPS_Res, Required_SLA, Criticality}, Res2 . . . ). Res1 and Res2 can refer to respective resources 1 and 2, Reqs can refer to extra requirements of an application (if any), UPS_Res can refer to a type of resource needed in terms of UPS requirements, Required_SLA can refer to performance for a workload that is required (e.g., frames per second or acceptable error rate), and Criticality can refer a level of criticality of a workload. To register resources, system software stack 502 can issue instruction RegisterResourceUPSChars (Res1={Reqs, UPS_Res, NoUPS_TemperatureThreshold}, Res2={ . . . }, . . . ). Parameter NoUPS_TemperatureThreshold can refer to a temperature at which a hardware resource does not operate properly or in compliance with UPS.

POD manager 504 can provide commands RegisterResourceUPSChars and RegisterResourceSLA to rack power manager 506. RegisterResourceSLA can specify portions of an SLA for a service that are to be met using a resource. Rack power manager 506 can provide commands RegisterResourceUPSChars, RegisterResourceSLA, and PowerScaleDown to sled power manager 508. PowerScaleDown can be a specification of an amount or ability to reduce power to a particular computing resource.

POD manager 504 provides an interface that allows services type (b) to provide a heartbeat or feedback to POD manager 504. This heartbeat or feedback can be used in case of resource failures to be sure that a workload is not failing to proceed (e.g., stops processing images). A power manager can provide the heartbeat or feedback to POD manager 504. For example, a power manager can provide ShutDownResource to indicate that a workload has been shut down or the resource allocated to perform a workload has been shut down. For example, a power manager can provide SLANotSatisfied to indicate that an error rate of a workload specified in an SLA is not satisfied.

At a rack or platform level (e.g., multiple resources available in a rack or platform), power delivery can be controlled by rack power manager 506 based on data and configurations in rack telemetry table 520. Rack telemetry table 520 can store configurations specified by system software 502 for a resource or workload. Rack telemetry table 520 can also store thermal data (e.g., temperature) of a rack of resources (shown as Thermals Telemetry). At a sled or resource level, power delivery to resources can be controlled by sled power manager 508 based on data and configurations in resource thermal telemetry 522. Resource thermal telemetry 522 can store resource-level temperature data (shown as Resource Thermal Telemetry) and performance data on a resource running a workload (shown as Resource Throughput Telemetry). Configurations in rack telemetry table 520 and resource thermal telemetry 522 can be set by a system software 502.

Resources 510 can include (FPGAs), graphics process units (GPUs), AI inference engines, memory, storage, central processing units (CPUs), and so forth. For example, an accelerator can use a neural network, processors, and memory. Processors can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as FPGAs. A neural network can be embodied as a separate neural network device use any components of processors. Multiple neural networks, processor cores, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Examples of resources 510 that are not UPS compliant include CPUs that do not support or operate in certain thermal conditions, some field programmable gate arrays (FPGAs), and some GPUs.

Edge power management block 530 can indicate a power outage (shown as PowerOutage) or cooling outage (shown as CoolingOutage). In some embodiments, for resources that are UPS compliant, no telemetry is provided and power supply or resource throttling is not provided. In some embodiments, for resources that are non-UPS compliant, performance information (data) is provided and power supply and resource throttling can be applied.

Rack power manager 506 or sled power manager 508 can perform the following actions every N units of time (where N can be defined by the orchestrator) for those platforms or resources that are non-UPS compliant running services with different level of criticality. Rack power manager 506 or sled power manager 508 can order the resources based on the level of criticality for the services that are using them (the less critical services first).

When a power outage or cooling outage occurs, power manager 506 or 508 can iterate over all the platforms or resources in a sled from lowest criticality level to highest criticality level and identify if the telemetry for a platform or resources in a sled indicates the performance thresholds indicated by software stack 502 (or orchestrator) are being satisfied. Lower criticality services (e.g., level 3) can be selected for shutdown or migration before or instead of a shutdown or migration of a higher criticality level (e.g., level 1). In addition, a non-UPS compliant resource that runs a lower criticality service (e.g., level 3) may have its power reduced before power is reduced (if any) for resource running a higher criticality level service (e.g., level 1). POD manager 504 or sled power manager 508 track error rates for each service with level (b) and each of its assigned resources. In a case where service performance is met and the amount of rack power budgeted for non-critical services is below a configurable threshold, the power management unit will maintain its power level.

In a case where the service performance is met and the amount of allocated rack power is above an allocated threshold, the power manager can reduce the amount of power supplied to the platform or resource by a percentage (e.g., 1%) that can be specified by system software stack 502 or configured by default. For example, sled power manager 508 can issue PowerScaleDown to a resource 510 to reduce its supplied power.

In a case where the services are not achieving the minimum performance required to run the service properly (where performance is not met), rack power manager 506 or sled power manager 508 can contact pod manager 504 to indicate that a particular platform's or resource's performance is failing to meet requirements (e.g., SLANotSatisfied). Pod manager 504 and/or system software 502 can determine whether the service should be shut down or power allocation threshold should be reconfigured or the service is migrated. In the event a workload or resource is shutdown, rack power manager 506 or sled power manager 508 can contact POD manager 504 to indicate a platform or resource is shutdown (e.g., using ShutDownResource).

When the error rate is higher than the specified permitted rate or the performance is not met, the workload can be hibernated and/or migrated to a UBS compliant resource. If a UBS compliant resource is not available, an error is generated to the orchestration stack (e.g., SLANotSatisfied). For example, generating an error to the orchestration stack can use technologies described in U.S. patent application publication 2018/0027067, entitled "METHODS AND APPARATUS FOR SDI SUPPORT FOR AUTOMATIC AND TRANSPARENT MIGRATION." When a heartbeat or feedback for a given workload of level (b) is not detected anymore, a notification is sent as well to the orchestration stack (e.g., SLANotSatisfied).

When a cooling outage happens, the power manager can iterate over all the platforms from lowest critical level to highest critical level and identify if the telemetry for a platform with for a critical level indicates the performance thresholds indicated by the software stack are being satisfied. In a case where performance is met and the thermal temperature for a non-critical service is above a configurable threshold, rack power manager 506 or sled power manager 508 can determine how much power has to be reduced for a particular resource or platform. Reducing an amount of power can reduce the amount of dissipated thermal for the different resources and platforms. Thereby, more aggressive approaches may be considered when power capping power provided to platform or resources.

For example, a composite node can be composed by the following computing resources. One UPS complaint FPGA and compute sled to run BNG and cable modem termination system (CMTS) NVFS. One non-UPS compliant FPGA and compute sled to run AR/VR with a level of criticality 2 that can operate without failure rate when thermals are below 60° F. One non-UPS compliant FPGA and compute sled to run biometry analysis with a level of criticality 1 that can operate without failure rate when thermals are below 60° F. In this example, the AR/VR is required to be executed above 60 frames per second for 100 users. If the throughput goes below this threshold due to the loss of power supplied to the FPGA and performance is not met, then a notification is sent to the pod manager and software stack. The system software stack is responsible to shut down the service or the power manager can do that automatically if it is configured to do so. For the FPGA and compute sled to run biometry analysis, in the case that amount of frames per second goes below 1 kiloframes/second, then the biometry analysis can be shut down by either or both of system software stack or power manager.

Although not depicted, any resource can provide results from completion of a service to a requester.

Figure 6:
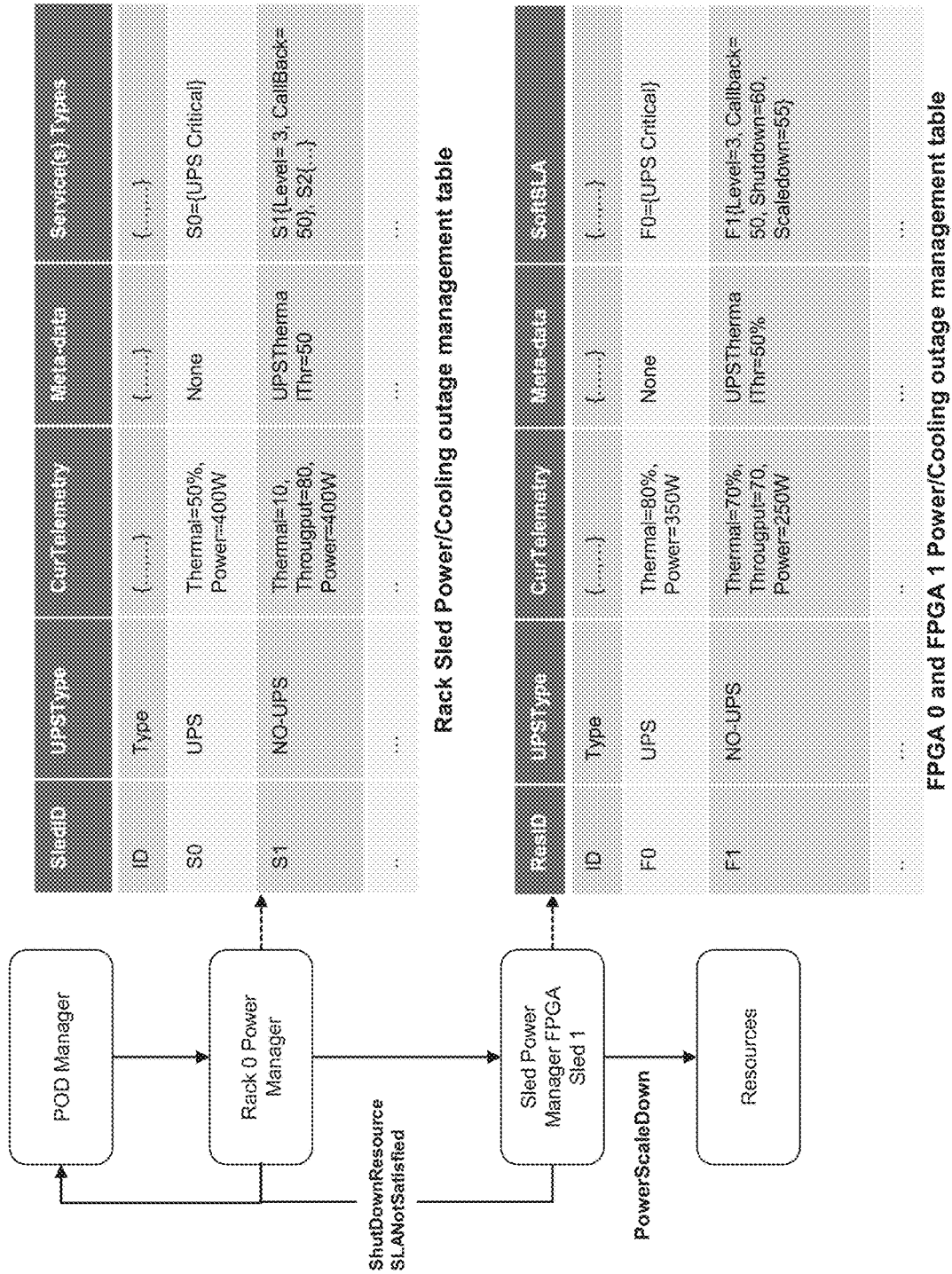
FIG. 6 provides an example on what type of data could be stored by or accessible to a power manager.

FIG. 6 provides an example of a type of data that could be stored by or accessible to a power manager. A power manager can expose or make available interfaces (e.g., application programming interfaces (APIs)) to configure the outage table (e.g., what type of resources the platform and rack has, type of allocated services, last known telemetry, UPS telemetry etc.). The power manager can store configurations and telemetry data for a rack, sled, resource, or workload. The power manager can gather and process platform and resource telemetry data in order to compute or store the resource telemetry that is used to identify when to throttle down power supplied to a resource or the resource or service is not performing as required by its SLA.

In this example, a rack power manager can identify resources in a rack such as compute sleds S0, S1 and so forth. Sled S0 can be UPS compliant but sled S1 is not UPS compliant. An entire sled can be UPS compliant or not compliant. Current telemetry (CurTelemetry) represents sled temperature, current power consumption by a sled, and in some cases throughput rate (e.g., frames per second, results per second). In this example, sled S0 has a thermal threshold of 50° F. and current power consumption of 400 W and sled S1 has a thermal threshold of 50° F., throughput of 80 frames/second, and current power consumption of 400 W. Meta-data can represent a temperature threshold at which feedback or corrective action may need to occur. For example, a sled S1 has a threshold temperature (UPSThermalThr) of 50° F. at which a corrective action is to take place. A Service Type can represent a criticality level or temperature threshold at which a callback to a system software or orchestrator can occur. In this example, sled S0 has Critical Level 0 (e.g., UPS compliant). Sled S1 has a Critical Level of 3 (not UPS compliant) and a temperature threshold of 50° F. at which a callback can occur.

At a sled level, sled power manager FPGA Sled 1 can track resources in sled 1 such as FPGA0 and FPGA1. In this example, resource FPGA0 has an identifier of F0 and resource FPGA1 has an identifier of F1. As indicated in the column UPSType, FPGA F0 can be UPS compliant (UPS) but sled F1 is not UPS compliant (NO-UPS). FPGA F0 has a thermal threshold of 80° F. and current power consumption of 350 W and FPGA F1 has a thermal threshold of 70° F., throughput of 70 frames/second, and current power consumption of 250 W. FPGA F0 has a threshold temperature (UPSThermalThr) of 50° F. at which a corrective action is to take place. A corrective action if UPSThermalThr is met can be to reduce power or shut down the resource. In this example, FPGA F0 has Criticality Level 0 (UPS compliant). FPGA F1 has a Critical Level of 3 (not UPS compliant) and a temperature threshold of 50° F. at which a callback can occur, a service shutdown at 60° F. (resource shutdown occurs at 60° F.), and a power supply scale down (reduction) when FPGA F1 reaches 55° F.

Figure 7A:
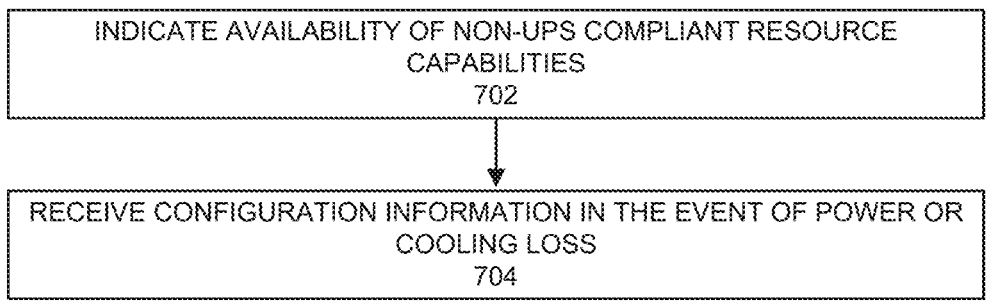
FIG. 7A depicts an example process that can be performed to configure power managers of a node.

FIG. 7A depicts an example process that can be performed to configure power managers of a node. At 702, availability of non-UPS compliant resource capabilities are exposed. For example, an orchestrator or node (e.g., edge node) can indicate that non-UPS compliant resources are available for performing a workload. A client device or node can offload workloads for performance by the non-UPS compliant resource. An API can be used to program non-UPS compliant resources. At 704, configuration information in the event of power or cooling loss are received. A power manager of the non-UPS compliant resource can be configured to use the non-UPS compliant resource to determine an action to take in the event of power or cooling loss. For example, configuration information can include one or more of: temperature threshold, workload performance, and actions to take in the event of a power outage or cooling outage.

Figure 7B:
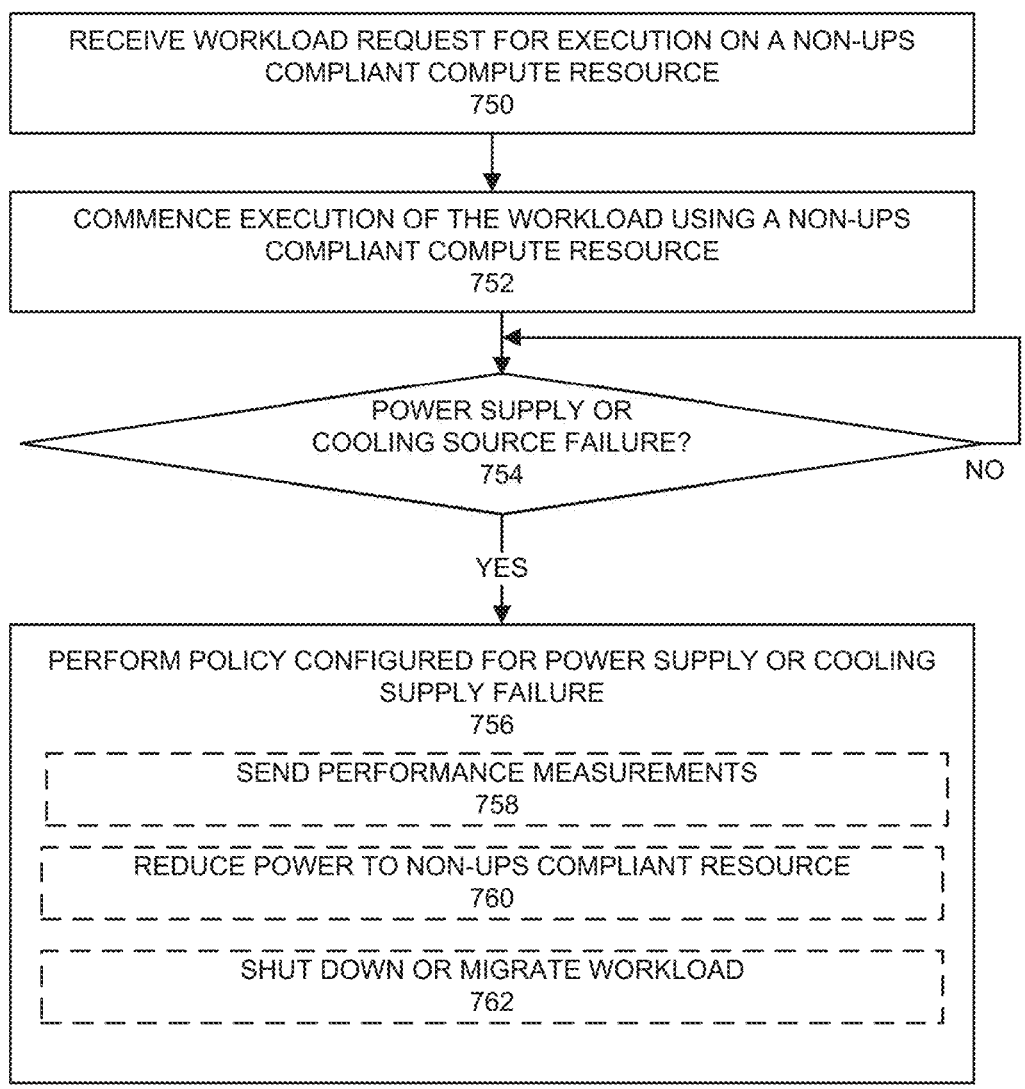
FIG. 7B depicts an example process that can be used by a non-UPS compliant compute resource.

FIG. 7B depicts an example process that can be used by a non-UPS compliant compute resource. At 750, a workload request is received for execution on a non-UPS compliant compute resource. The non-UPS compliant compute resource can be located in an edge node, fog node, data center, any server, or a rack. At 752, the workload commences execution using a non-UPS compliant compute resource. At 754, a determination is made as to whether the power supply or cooling supply has failed. If neither the power supply or cooling supply has failed, then 754 can repeat. If the power supply or cooling supply has failed, then 756 follows. At 756, a policy configured based on configuration information for power supply or cooling supply failure is performed. For example, any of 758, 760, or 762 can be performed. For example, at 758, performance measurements can be sent to an orchestrator or client. Performance measurements can include error rate or frame generation rate or other performance metrics. For example, at 760, if the temperature exceeds a temperature threshold, the power can be reduced to the non-UPS resource. In some cases, if the performance of the workload is acceptable according to the configuration information, the power can be reduced but is not reduced if the performance is not acceptable. For example, at 762, if performance measurements fail to meet a threshold specified by the configuration information, the workload can be shut down at the non-UPS compliant resource or migrated for performance by another resource (e.g., UPS-compliant or non-UPS compliant). In the event of a power outage or cooling outage, selection of a workload or a resource to modify can be iterated over from lowest criticality workload to highest criticality workload so that lower criticality workloads are more likely to be impacted than higher criticality workloads.

If a workload finishes execution, the results can be provided to the requester (e.g., client, node, or other device).

Figure 8:
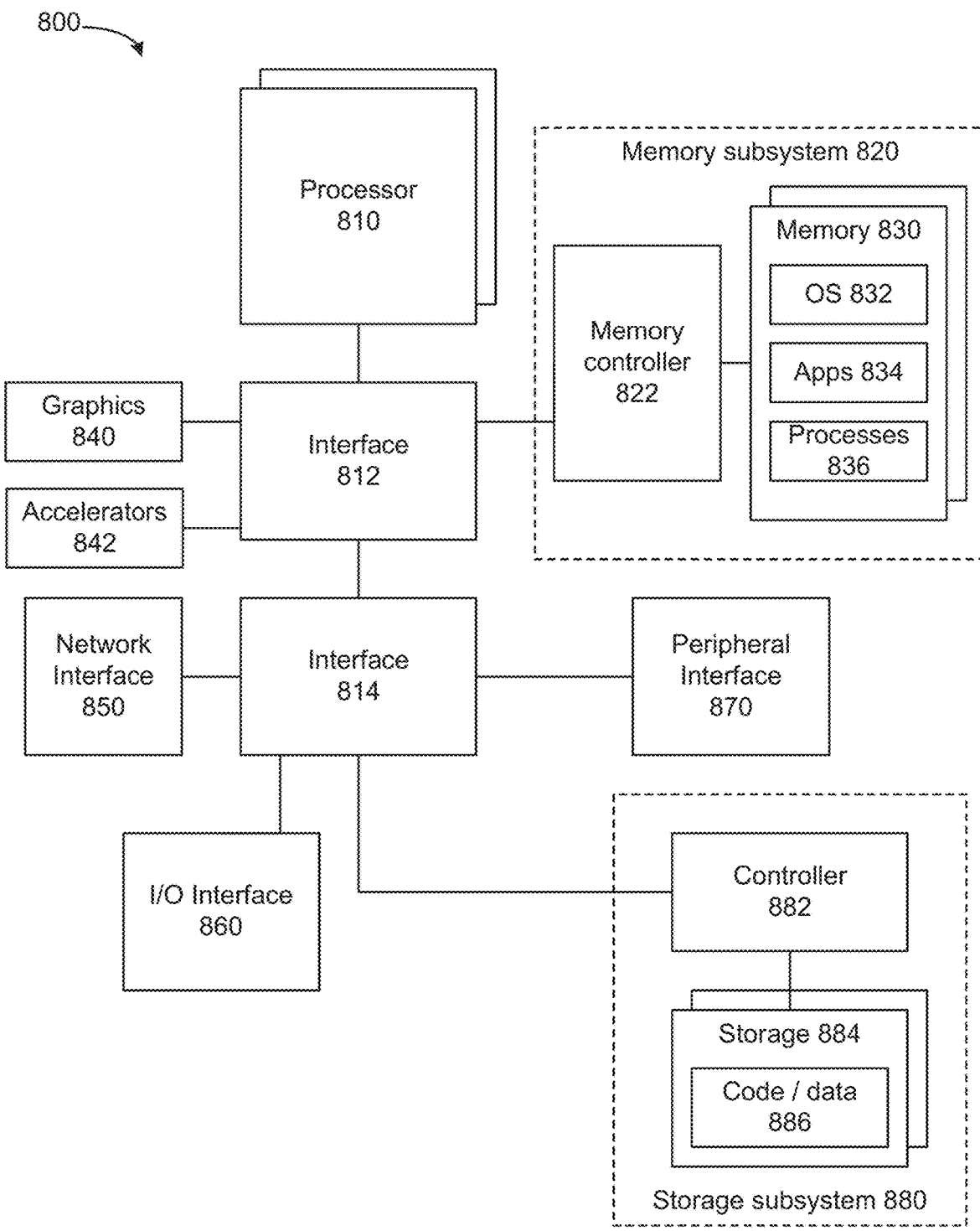
FIG. 8 depicts an example system in accordance with some embodiments.

FIG. 8 depicts a system. The system can use embodiments described herein. System 800 includes processor 810, which provides processing, operation management, and execution of instructions for system 800. Processor 810 can include any type of microprocessor, central processing unit (CPU), graphics processing unit (GPU), processing core, or other processing hardware to provide processing for system 800, or a combination of processors. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820, graphics interface components 840, or accelerators 842. Interface 812 represents an interface circuit, which can be a standalone component or integrated onto a processor die. Where present, graphics interface 840 interfaces to graphics components for providing a visual display to a user of system 800. In one example, graphics interface 840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

Accelerators 842 can be a fixed function offload engine that can be accessed or used by a processor 810. For example, an accelerator among accelerators 842 can provide compression (DC) capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 842 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 800 includes interface 814, which can be coupled to interface 812. In one example, interface 814 represents an interface circuit, which can include standalone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a remote device, which can include sending data stored in memory. Network interface 850 can receive data from a remote device, which can include storing received data into memory. Various embodiments can be used in connection with network interface 850, processor 810, and memory subsystem 820.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (i.e., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (i.e., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814.

A power source (not depicted) provides power to the components of system 800. More specifically, power source typically interfaces to one or multiple power supplies in system 800 to provide power to the components of system 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 800 can be implemented using interconnected compute sleds of processors, memories, storages, network interfaces, and other components. High speed interconnects can be used such as PCIe, Ethernet, or optical interconnects (or a combination thereof).

Figure 9:
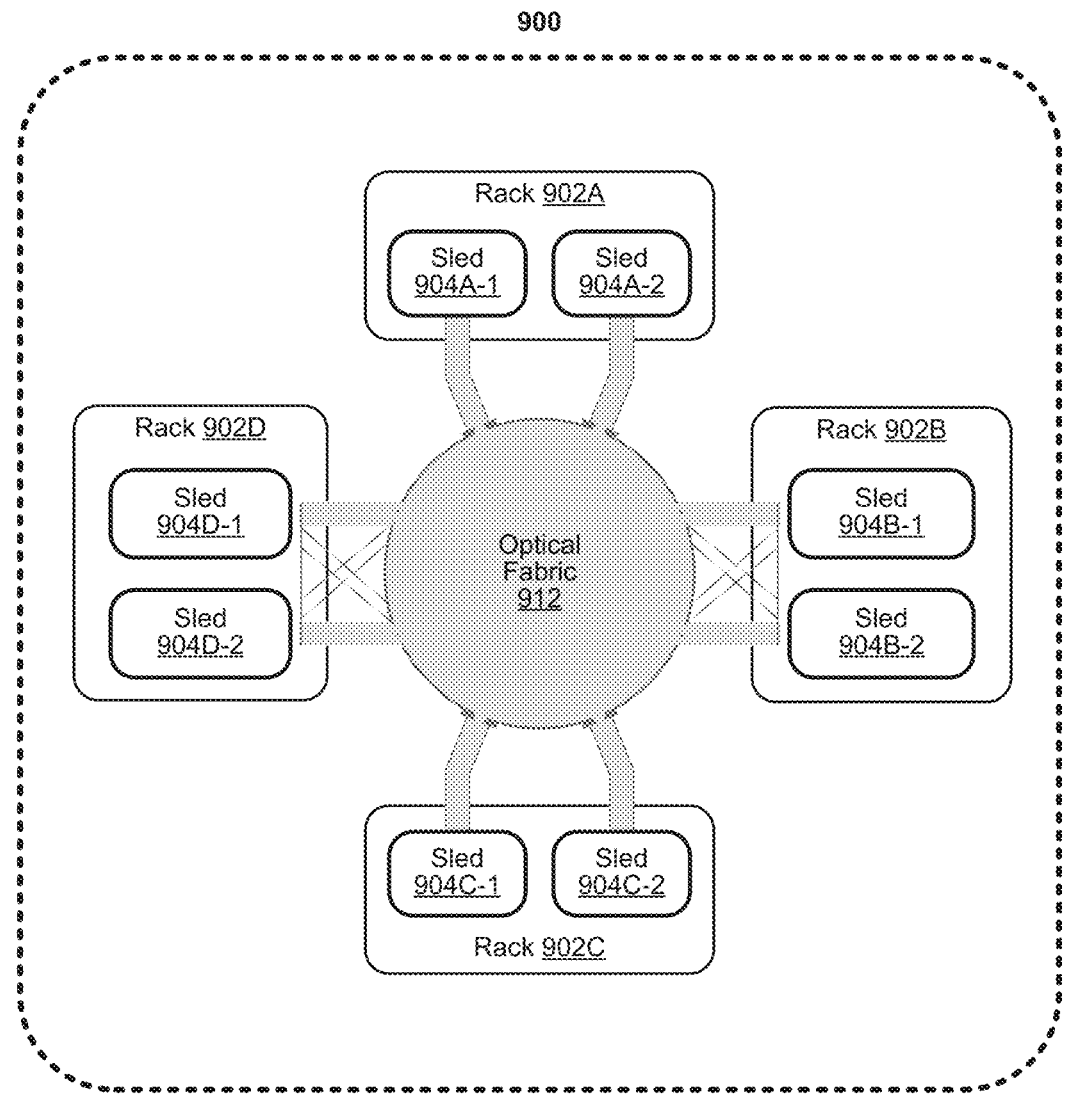
FIG. 9 depicts an example of a data center in accordance with some embodiments.

FIG. 9 depicts an example of a data center. Various embodiments can be used in or with the data center of FIG. 9. As shown in FIG. 9, data center 900 may include an optical fabric 912. Optical fabric 912 may generally include a combination of optical signaling media (such as optical cabling) and optical switching infrastructure via which any particular sled in data center 900 can send signals to (and receive signals from) the other sleds in data center 900. However, optical, wireless, and/or electrical signals can be transmitted using fabric 912. The signaling connectivity that optical fabric 912 provides to any given sled may include connectivity both to other sleds in a same rack and sleds in other racks. Data center 900 includes four racks 902A to 902D and racks 902A to 902D house respective pairs of sleds 904A-1 and 904A-2, 904B-1 and 904B-2, 904C-1 and 904C-2, and 904D-1 and 904D-2. Thus, in this example, data center 900 includes a total of eight sleds. Optical fabric 912 can provide sled signaling connectivity with one or more of the seven other sleds. For example, via optical fabric 9012, sled 904A-1 in rack 902A may possess signaling connectivity with sled 904A-2 in rack 902A, as well as the six other sleds 904B-1, 904B-2, 904C-1, 904C-2, 904D-1, and 904D-2 that are distributed among the other racks 902B, 902C, and 902D of data center 900. The embodiments are not limited to this example. For example, fabric 912 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a power and workload manager apparatus comprising an interface; at least one computing resource comprising one or more of: at least one uninterruptible power supply form (UPS) compatible computing resource and at least one non-uninterruptible power supply form (non-UPS) compatible computing resource, wherein a UPS compliant computing resource is to comply with uninterruptible power supply aspects of Network Equipment-Building System (NEBS) level 3 or equivalents; and at least one processor communicatively coupled to the interface and the at least one computing resource, the at least one processor to: receive a workload for execution using a non-UPS compatible computing resource; receive a configuration for the workload based on a power source failure, wherein the configuration comprises performance criteria and associated actions; and cause execution of the workload using a first non-UPS compatible computing resource.

Example 2 includes the subject matter of any Example, wherein in response to a failure of a power source to the first non-UPS compatible computing resource, the at least one processor is to provide one or more of: a performance indicator or temperature of the first non-UPS compatible computing resource and the performance indicator includes one or more of: error rate or frame rate.

Example 3 includes the subject matter of any Example, wherein in response to a failure of a power source to the first non-UPS compliant computing resource and an error rate of the workload indicating unacceptable performance based on the performance criteria, the at least one processor is to cause termination of execution of the workload.

Example 4 includes the subject matter of any Example, wherein in response to a failure of a power source to the first non-UPS compliant computing resource and an error rate of the workload indicating unacceptable performance based on the performance criteria, the at least one processor is to cause migration of the workload to another UPS compatible resource or a non-UPS compatible resource for execution.

Example 5 includes the subject matter of any Example, wherein in response to a failure of power source to the first non-UPS compatible computing resource and an error rate of the workload indicating acceptable performance based on the performance criteria, the at least one processor is to perform an associated action to reduce power supplied to the first non-UPS compatible computing resource.

Example 6 includes the subject matter of any Example, wherein the at least one processor is to receive a configuration for the workload based on a failure of a cooling source to the first non-UPS compatible computing resource, wherein the configuration for the workload based on a failure of a cooling source to the first non-UPS compatible computing resource comprises temperature threshold, performance criteria, and associated actions.

Example 7 includes the subject matter of any Example, wherein in response to a failure of a cooling source to the first non-UPS compatible computing resource, a temperature of the first non-UPS compatible computing resource exceeding the temperature threshold, and an error rate of the workload indicating acceptable performance based on the performance criteria, the at least one processor is to perform an associated action to reduce power supplied to the first non-UPS compatible computing resource.

Example 8 includes the subject matter of any Example, wherein a computing resource comprises one or more of: a processor, graphics processing unit, storage, memory, programmable control logic, field programmable gate arrays (FPGAs), artificial intelligence inference engines, image processing engine, or hardware-executed processes.

Example 9 includes the subject matter of any Example, and including one or more of: a base station, central office, server, rack, or data center.

Example 10 includes the subject matter of any Example, wherein the at least one processor is to identify any UPS compatible computing resource and any non-UPS compatible computing resource to a workload requester.

Example 11 includes a method comprising receiving a workload designated for execution on a non-uninterruptible power supply form (non-UPS) compatible computing resource, wherein a non-UPS compatible computing resource does not comply with uninterruptible power supply aspects of Network Equipment-Building System (NEBS) level 3 or equivalents; receiving a configuration for the workload, the configuration related to power failure and cooling supply failure and the configuration comprising one or more of: threshold temperature, performance criteria, and associated actions; and dispatching the workload on a first non-UPS compatible computing resource.

Example 12 includes the subject matter of any Example, wherein in response to a failure of a power source to the first non-UPS compatible computing resource, providing one or more of: a performance indicator or temperature of the first non-UPS compatible computing resource, wherein the performance indicator includes one or more of: error rate or frame rate.

Example 13 includes the subject matter of any Example, wherein in response to a failure of a power source to the first non-UPS compatible computing resource and an error rate of the workload indicating unacceptable performance based on the performance criteria, causing termination of execution of the workload.

Example 14 includes the subject matter of any Example, wherein in response to a failure of a power source to the first non-UPS compatible computing resource and an error rate of the workload indicating unacceptable performance based on the performance criteria, causing migration of the workload to another UPS or non-UPS compatible resource for execution.

Example 15 includes the subject matter of any Example, wherein in response to a failure of a power source to the first non-UPS compatible computing resource and an error rate of the workload indicating acceptable performance based on the performance criteria, reducing power supplied to the first non-UPS compatible computing resource.

Example 16 includes the subject matter of any Example, wherein in response to a failure of a power source to the first non-UPS compatible computing resource, a temperature of the first non-UPS compatible computing resource exceeding the threshold temperature, and an error rate of the workload indicating acceptable performance based on the performance criteria, reducing power supplied to the first non-UPS compatible computing resource.

Example 17 includes the subject matter of any Example, wherein a computing resource comprises one or more of: a processor, graphics processing unit, storage, memory, programmable control logic, field programmable gate arrays (FPGAs), artificial intelligence inference engines, image processing engine, or hardware-executed processes.

Example 18 includes a power management and resource management system comprising: an interface; at least one uninterruptible power supply form (UPS) compatible computing resource, wherein a UPS compliant computing resource is to comply with uninterruptible power supply aspects of Network Equipment-Building System (NEBS) level 3 or equivalents; at least one non-uninterruptible power supply form (non-UPS) compatible computing resource; and at least one processor communicatively coupled to the interface, the at least one UPS compatible computing resource, and the at least one non-UPS compatible computing resource, the at least one processor to: receive a workload for execution using a UPS compatible computing resource; receive a second workload for execution using a non-UPS compatible computing resource; receive a configuration for the second workload based on a power source failure or a cooling source failure, wherein the configuration comprises threshold temperature, performance criteria, and associated actions; cause execution of the second workload using a first non-UPS compatible computing resource; and cause results from the second workload to be transmitted to a workload requester.

Example 19 includes the subject matter of any Example, wherein in response to a failure of a power source to the first non-UPS compatible computing resource and an error rate of the second workload indicating unacceptable performance based on the performance criteria, the at least one processor is to cause termination of execution of the second workload on the first non-UPS compliant computing resource.

Example 20 includes the subject matter of any Example, wherein in response to a failure of a power source to the first non-UPS compliant computing resource and an error rate of the second workload indicating acceptable performance based on the performance criteria, the at least one processor is to perform an associated action to reduce power supplied to the first non-UPS compliant computing resource.

Example 21 includes the subject matter of any Example, wherein in response to a failure of a cooling source to the first non-UPS compliant computing resource, a temperature of the first non-UPS compliant computing resource exceeding the temperature threshold, and an error rate of the second workload indicating acceptable performance based on the performance criteria, the at least one processor is to perform an associated action to reduce power supplied to the first non-UPS compliant computing resource.

Example 22 includes the subject matter of any Example, wherein a computing resource comprises one or more of: a processor, graphics processing unit, storage, memory, programmable control logic, field programmable gate arrays (FPGAs), artificial intelligence inference engines, image processing engine, or hardware-executed processes.

Example 23 includes a client device comprising: a network interface and at least one processor communicatively coupled to the network interface, the at least one processor to: discover at a node any uninterruptible power supply form (UPS) compliant computing resource and non-uninterruptible power supply form (non-UPS) compliant computing resource, wherein a UPS compliant computing resource is to comply with uninterruptible power supply aspects of Network Equipment-Building System (NEBS) level 3 or equivalents; cause a workload request to be transmitted to the node using the network interface, the workload request to be performed on a non-UPS compliant computing resource; and cause a configuration for the workload based on a power source failure or a cooling source failure to be transmitted to the node using the network interface, wherein the configuration comprises threshold temperature, performance criteria, and associated actions.

Example 24 includes the subject matter of any Example, wherein the at least one processor is to access a performance information concerning the workload from the node.

What is claimed is:

1. A power and workload manager apparatus comprising:
at least two computing resources comprising at least one uninterruptible power supply form (UPS) compatible computing resource and at least one non-uninterruptible power supply form (non-UPS) compatible computing resource, wherein the at least one UPS compatible computing resource is compatible with uninterruptible power supply aspects of Network Equipment-Building System (NEBS) level 3; and
at least one processor communicatively coupled to the at least two computing resources, the at least one processor to:
receive a workload for execution using a non-UPS compatible computing resource based on an indication provided by a requester of performance of the received workload that requests that the workload be executed using a non-UPS compatible computing resource;

receive a configuration for the workload, wherein the configuration for the workload is to indicate power source parameters for execution of the workload based on a power source failure, wherein the configuration comprises performance criteria and associated actions;

cause execution of the workload using a first non-UPS compatible computing resource based on the indication that the workload is to be executed using a non-UPS compatible computing resource, wherein in response to a failure of a power source to the first non-UPS compatible computing resource and an error rate of the workload indicating unacceptable performance based on the performance criteria, the at least one processor is to cause migration of the workload to a UPS compatible resource or another non-UPS compatible resource for execution; and provide a result from the execution of the workload.

2. The apparatus of claim 1, wherein:
in response to a failure of a power source to the first non-UPS compatible computing resource, the at least one processor is to provide one or more of: a performance indicator or temperature of the first non-UPS compatible computing resource and
the performance indicator includes one or more of: error rate of the workload or frame rate generated by the virtual reality (VR)/augmented reality (AR) operations of the workload.

3. The apparatus of claim 1, wherein:
in response to a failure of a power source to the first non-UPS compatible computing resource and an error rate of the workload indicating unacceptable performance based on the performance criteria, the at least one processor is to cause termination of execution of the workload.

4. The apparatus of claim 1, wherein:
in response to a failure of power source to the first non-UPS compatible computing resource and an error rate of the workload indicating acceptable performance based on the performance criteria, the at least one processor is to perform an associated action to reduce an amount of power supplied to the first non-UPS compatible computing resource.

5. The apparatus of claim 1, wherein the at least one processor is to:
receive a configuration for the workload based on a failure of a cooling source to the first non-UPS compatible computing resource, wherein the configuration for the workload based on a failure of a cooling source to the first non-UPS compatible computing resource comprises temperature threshold, performance criteria, and associated actions.

6. The apparatus of claim 5, wherein:
in response to (i) a failure of a cooling source to the first non-UPS compatible computing resource, (ii) a temperature of the first non-UPS compatible computing resource exceeding the temperature threshold, and (iii) an error rate of the workload indicating acceptable performance based on the performance criteria, the at least one processor is to perform an associated action to reduce power supplied to the first non-UPS compatible computing resource while the first non-UPS compatible computing resource executes the workload.

7. The apparatus of claim 1, wherein a computing resource of the at least two computing resources comprise one or more of: a processor, graphics processing unit, storage, memory, programmable control logic, field pro-grammable gate arrays (FPGAs), artificial intelligence inference engines, image processing engine, or hardware-executed processes.

8. The apparatus of claim 1, comprising one or more of: a base station, central office, server, rack, or data center.

9. The apparatus of claim 1, wherein the at least one processor is to:
identify availability of at least one UPS compatible computing resource and availability of at least one non-UPS compatible computing resource to a workload requester.

10. A method comprising:
receiving a workload designated for execution on a non-uninterruptible power supply form (non-UPS) compatible computing resource with an indication, from a sender of the workload, to request execution of the workload using a non-UPS compatible computing resource, wherein a non-UPS compatible computing resource does not comply with uninterruptible power supply aspects of Network Equipment-Building System (NEBS) level 3;

receiving a configuration for the workload, the configuration related to performance of the workload in an event of a power failure and cooling supply failure and the configuration comprising threshold temperature, performance criteria, and associated actions; and dispatching the workload on a first non-UPS compatible computing resource for execution by the first non-UPS compatible computing resource based on the indication from the sender of the workload to execute the workload using a non-UPS compatible computing resource, wherein in response to a failure of a power source to the first non-UPS compatible computing resource and an error rate of the workload indicating unacceptable performance based on the performance criteria, causing migration of the workload to a UPS compatible resource or another non-UPS compatible resource for execution.

11. The method of claim 10, wherein:
in response to a failure of a power source to the first non-UPS compatible computing resource, providing one or more of: a performance indicator or temperature of the first non-UPS compatible computing resource, wherein the performance indicator includes one or more of: error rate of the workload or frame rate generated by virtual reality (VR)/augmented reality (AR) operations of the workload.

12. The method of claim 10, wherein:
in response to a failure of a power source to the first non-UPS compatible computing resource and an error rate of the workload indicating unacceptable performance based on the performance criteria, causing termination of execution of the workload.

13. The method of claim 10, wherein:
in response to a failure of a power source to the first non-UPS compatible computing resource and an error rate of the workload indicating unacceptable performance based on the performance criteria, causing migration of the workload to another UPS or non-UPS compatible resource for execution.

14. The method of claim 10, wherein:
in response to a failure of a power source to the first non-UPS compatible computing resource and an error rate of the workload indicating acceptable performance based on the performance criteria, reducing power supplied to the first non-UPS compatible computing resource.

15. The method of claim 10, wherein:
in response to a failure of a power source to the first non-UPS compatible computing resource, a temperature of the first non-UPS compatible computing resource exceeding the threshold temperature, and an error rate of the workload indicating acceptable performance based on the performance criteria, reducing power supplied to the first non-UPS compatible computing resource.

16. The method of claim 10, wherein the first non-UPS computing resource comprises one or more of: a processor, graphics processing unit, storage, memory, programmable control logic, field programmable gate arrays (FPGAs), artificial intelligence inference engines, image processing engine, or hardware-executed processes.

17. A power management and resource management system comprising:
a communication interface;
at least one uninterruptible power supply form (UPS) compatible computing resource, wherein a UPS compliant computing resource is compatible with uninterruptible power supply aspects of Network Equipment-Building System (NEBS) level 3;
at least one non-uninterruptible power supply form (non-UPS) compatible computing resource; and
at least one processor communicatively coupled to the communication interface, the at least one UPS compatible computing resource, and the at least one non-UPS compatible computing resource, the at least one processor to:
receive a workload identified for execution using a UPS compatible computing resource;
cause execution of the workload using a first UPS compatible computing resource;
receive a second workload and an indication from a sender of the workload that identifies the second workload is to be executed using a non-UPS compatible computing resource;
receive a configuration for the second workload based on a power source failure or a cooling source failure, wherein the configuration comprises threshold temperature, performance criteria, and associated actions;
cause execution of the second workload using a first non-UPS compatible computing resource based on the indication from the sender of the workload that identifies the second workload is to be executed using a non-UPS compatible computing resource, wherein in response to a failure of a power source to the first non-UPS compatible computing resource and an error rate of the second workload indicating unacceptable performance based on the performance criteria, the at least one processor is to cause migration of the second workload to a UPS compatible resource or another non-UPS compatible resource for execution; and
cause results from the workload and the second workload to be transmitted to at least one workload requester.

18. The system of claim 17, wherein:
in response to a failure of a power source to the first non-UPS compatible computing resource and an error rate of the second workload indicating unacceptable performance based on the performance criteria, the at least one processor is to cause termination of execution of the second workload on the first non-UPS compatible computing resource.

19. The system of claim 17, wherein:
in response to a failure of a power source to the first non-UPS compatible computing resource and an error rate of the second workload indicating acceptable performance based on the performance criteria, the at least one processor is to perform an associated action to reduce power supplied to the first non-UPS compatible computing resource.

20. The system of claim 17, wherein:
in response to a failure of a cooling source to the first non-UPS compatible computing resource, a temperature of the first non-UPS compatible computing resource exceeding the temperature threshold, and an error rate of the second workload indicating acceptable performance based on the performance criteria, the at least one processor is to perform an associated action to reduce power supplied to the first non-UPS compatible computing resource.

21. The system of claim 17, wherein the first UPS compatible computing resource comprises one or more of: a processor, graphics processing unit, storage, memory, programmable control logic, field programmable gate arrays (FPGAs), artificial intelligence inference engines, image processing engine, or hardware-executed processes and wherein the first non-UPS compatible computing resource comprises one or more of: a processor, graphics processing unit, storage, memory, programmable control logic, field programmable gate arrays (FPGAs), artificial intelligence inference engines, image processing engine, or hardware-executed processes.

22. A client device comprising:
a network interface and
at least one processor communicatively coupled to the network interface, wherein the at least one processor is to:
discover, at a node, an uninterruptible power supply form (UPS) compatible computing resource and non-uninterruptible power supply form (non-UPS) compatible resource, wherein a UPS compatible computing resource is compatible with uninterruptible power supply aspects of Network Equipment-Building System (NEBS) level 3;
cause a workload request to be transmitted to the node using the network interface, with an indication associated with the workload request to identify a workload associated with the workload request is to be performed by a non-UPS compatible computing resource;
cause a configuration for the workload based on a power source failure or a cooling source failure to be transmitted to the node using the network interface, wherein the configuration comprises threshold temperature, performance criteria, and associated actions and wherein based a failure of a power source to the non-UPS compatible computing resource and an error rate of the workload indicating unacceptable performance based on the performance criteria, the workload is migrated for execution on a UPS compatible resource or another non-UPS compatible resource; and
receive a result of execution of the workload from the node.

23. The client device of claim 22, wherein the at least one processor is to access a performance information concerning the workload from the node.

24. At least one non-transitory computer-readable medium comprising instructions stored thereon, that if executed by one or more processors, cause the one or more processors to:

based on a reduction in power supplied to an edge server:
allocate at least one workload for execution on an uninterruptible power supply form (UPS) compatible computing resource based on an indication that the at least one workload is to be executed using a UPS compatible computing resource;
allocate at least one workload for execution on a non-uninterruptible power supply form (non-UPS) compatible computing resource based on an indication that the at least one workload is to be executed using a non-UPS compatible computing resource, wherein based a failure of a power source to the non-UPS compatible computing resource and an error rate of the at least one workload indicating unacceptable performance based on performance criteria, migrate the at least one workload for execution on a UPS compatible resource or another non-UPS compatible resource; and
output a result of execution of the at least one workload from execution by the UPS compatible computing resource and a result of execution of the at least one workload from execution by the non-UPS compatible computing resource, wherein the edge server comprises the UPS compatible computing resource and the non-UPS compatible computing resource.

25. The at least one non-transitory computer-readable medium of claim 24, comprising instructions stored thereon, that if executed by one or more processors, cause the one or more processors to:
modify power supplied to the non-UPS compatible computing resource based on acceptable performance of the at least one workload executing on the non-UPS compatible computing resource.

* * * * *